United States Patent
Lin

(10) Patent No.: US 11,032,896 B2
(45) Date of Patent: Jun. 8, 2021

(54) CONTROL APPARATUS FOR LIGHT EMITTING DIODES

(71) Applicant: Chicony Power Technology Co., Ltd., New Taipei (TW)

(72) Inventor: Chen-Chi Lin, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 134 days.

(21) Appl. No.: 16/653,483

(22) Filed: Oct. 15, 2019

(65) Prior Publication Data

US 2021/0068214 A1 Mar. 4, 2021

(30) Foreign Application Priority Data

Aug. 28, 2019 (TW) .................................. 108130914

(51) Int. Cl.
*H05B 45/37* (2020.01)
*H05B 47/20* (2020.01)
*H05B 45/58* (2020.01)

(52) U.S. Cl.
CPC ............. *H05B 47/20* (2020.01); *H05B 45/37* (2020.01); *H05B 45/58* (2020.01)

(58) Field of Classification Search
CPC ........ H05B 45/14; H05B 45/30; H05B 45/37; H05B 45/50; H05B 45/58; H05B 47/10; H05B 47/20; H02M 1/00; H02M 3/156; H02M 3/33507

See application file for complete search history.

(56) References Cited

U.S. PATENT DOCUMENTS

| | | | |
|---|---|---|---|
| 8,624,513 B2 * | 1/2014 | Moss | H05B 45/375 315/193 |
| 9,030,107 B2 * | 5/2015 | Ido | H05B 45/3725 315/186 |
| 9,161,414 B2 | 10/2015 | Brancken et al. | |
| 9,999,110 B2 | 6/2018 | Liang et al. | |
| 10,085,333 B1 | 9/2018 | Huang et al. | |

(Continued)

FOREIGN PATENT DOCUMENTS

CN 103716972 A 4/2014
CN 103959902 A 7/2014

(Continued)

*Primary Examiner* — Thai Pham
(74) *Attorney, Agent, or Firm* — Innovation Capital Law Group, LLP; Vic Lin

(57) ABSTRACT

A control apparatus for light emitting diodes (LEDs) includes a voltage conversion unit connected to an LED unit to convert an input voltage to supply the LED unit. A voltage difference detecting unit is connected to the LED unit for detecting an output voltage of the LED unit, and the voltage difference detecting unit includes a first resistor, a second resistor and a transistor. A control unit is connected to the voltage difference detecting unit and a hysteresis driving unit, and the control unit cooperates with the voltage difference detecting unit to provide a predetermined voltage. When the output voltage is less than the predetermined voltage, the control unit notifies the hysteresis driving unit to control the switching unit to be short-circuited, so that the voltage conversion unit stops converting the input voltage to cause the LEDs to be completely extinguished.

10 Claims, 4 Drawing Sheets

(56) References Cited

U.S. PATENT DOCUMENTS

| | | | |
|---|---|---|---|
| 10,334,690 B1 | 6/2019 | Hsu et al. | |
| 10,342,089 B1 * | 7/2019 | Lin | F21V 29/508 |
| 10,360,969 B2 | 7/2019 | Takagimoto et al. | |
| 10,638,566 B2 * | 4/2020 | Chen | H05B 45/375 |
| 2012/0146515 A1 * | 6/2012 | Chuang | H05B 45/37 |
| | | | 315/129 |
| 2013/0020946 A1 * | 1/2013 | Boezen | H05B 45/50 |
| | | | 315/127 |
| 2013/0127361 A1 * | 5/2013 | Weng | H05B 45/37 |
| | | | 315/224 |
| 2013/0147361 A1 * | 6/2013 | Kang | H05B 47/23 |
| | | | 315/122 |
| 2013/0307416 A1 | 11/2013 | Xu et al. | |
| 2016/0033584 A1 | 2/2016 | Kolanko et al. | |

FOREIGN PATENT DOCUMENTS

| | | |
|---|---|---|
| CN | 204887643 U | 12/2015 |
| CN | 103260323 B | 2/2016 |
| CN | 208609233 U | 3/2019 |
| TW | M298538 U | 10/2006 |
| TW | 200734217 A | 9/2007 |
| TW | I513363 B | 12/2015 |
| TW | I607673 B | 12/2017 |
| TW | I647975 B | 1/2019 |
| TW | I654903 B | 3/2019 |

* cited by examiner

CONTROL APPARATUS FOR LIGHT EMITTING DIODES

CROSS-REFERENCE TO RELATED APPLICATION

This non-provisional application claims priority under 35 U.S.C. § 119(a) to Patent Application No. 108130914 filed in Taiwan, R.O.C. on Aug. 28, 2019, the entire contents of which are hereby incorporated by reference.

BACKGROUND

Technical Field

The present invention relates to a control circuit, and in particular, to a control apparatus for light emitting diodes (LEDs).

Related Art

With progress of light emitting diode (LED) technologies, LED has increasingly diversified application from a mere indication purpose to an illumination function as a light source. In addition, because luminance and efficiency of the LED are effectively improved, the LED is also widely applied to lamps.

For example, the LEDs are used as a vehicle lamp. The vehicle lamp mainly includes one or more LED strings. Each LED string consists of a plurality of LEDs, and the LED string is connected to an output terminal of a buck-boost voltage converter, so as to supply, using the buck-boost voltage converter, power to light the LED string. When an LED is short-circuited due to damage, the damaged LED is extinguished, and remaining LEDs continue being lit. However, if only some LEDs are lit because some LEDs are damaged, overall appearance of a vehicle lamp is unaesthetic, and driving safety is even affected as a result of insufficient luminance.

SUMMARY

The present invention provides a control apparatus for light emitting diodes (LEDs), including an LED unit, a voltage conversion unit, a voltage difference detecting unit, a control unit, a hysteresis driving unit, and a switching unit. The voltage conversion unit is electrically connected to the LED unit to convert an input voltage to supply the LED unit. The voltage difference detecting unit is electrically connected to the LED unit for detecting an output voltage of the LED unit, and the voltage difference detecting unit includes a first resistor, a second resistor, and a transistor. The first resistor is electrically connected to a positive terminal of the LED unit, and the transistor is electrically connected to the first resistor, the second resistor, and a negative terminal of the LED unit respectively. The control unit is electrically connected to the voltage difference detecting unit and the hysteresis driving unit, and the control unit cooperates with the voltage difference detecting unit to provide a predetermined voltage. The switching unit is electrically connected to the hysteresis driving unit and the voltage conversion unit. When the output voltage is greater than or equal to the predetermined voltage, the control unit notifies the hysteresis driving unit to control the switching unit to be open-circuited, so that the voltage conversion unit continuously converts the input voltage. When the output voltage is less than the predetermined voltage, the control unit notifies the hysteresis driving unit to control the switching unit to be short-circuited, so that the voltage conversion unit stops converting the input voltage.

In some embodiments, the voltage difference detecting unit further includes a first capacitor connected to the second resistor in parallel.

In some embodiments, the control unit includes a comparison element, and the comparison element is electrically connected between the transistor and the second resistor. When the output voltage is greater than or equal to the predetermined voltage, the comparison element is short-circuited. When the output voltage is less than the predetermined voltage, the comparison element is open-circuited.

In some embodiments, the predetermined voltage is $$V_{EB} + \frac{V_{ref}}{R2} \times R1,$$

$V_{EB}$ is an emitter-base voltage of the transistor, R1 is a resistance value of the first resistor, R2 is a resistance value of the second resistor, and $V_{ref}$ is a built-in reference voltage of the comparison element.

In some embodiments, the hysteresis driving unit includes a third resistor and a fourth resistor, the third resistor, the fourth resistor, the comparison element, and the switching unit are connected to a node. When the comparison element is short-circuited, the node has a first voltage. When the comparison element is open-circuited, the node has a second voltage.

In some embodiments, the hysteresis driving unit further includes a second capacitor, the second capacitor is electrically connected to the node and is connected to the fourth resistor in parallel to delay actuation of the switching unit.

In some embodiments, the control unit further includes a fifth resistor electrically connected between the comparison element and the node.

In some embodiments, the switching unit includes a switching element, the switching element is open-circuited when receiving the first voltage, and the switching element is short-circuited when receiving the second voltage.

In some embodiments, when the switching element is open-circuited, the switching element outputs an enable signal to the voltage conversion unit. When the switching element is short-circuited, the switching element outputs a disable signal to the voltage conversion unit.

In some embodiments, the voltage conversion unit further includes a controller, when the controller receives the enable signal, the voltage conversion unit continuously converts the input voltage. When the controller receives the disable signal, the voltage conversion unit stops converting the input voltage.

Therefore, in the present invention, when the output voltage changes as a result of damage of an LED in the light-emitting diode unit, the voltage conversion unit may be controlled to stop converting the input voltage supplied to the LED unit, so that the LEDs are completely extinguished.

DETAILED DESCRIPTION

Figure 1:
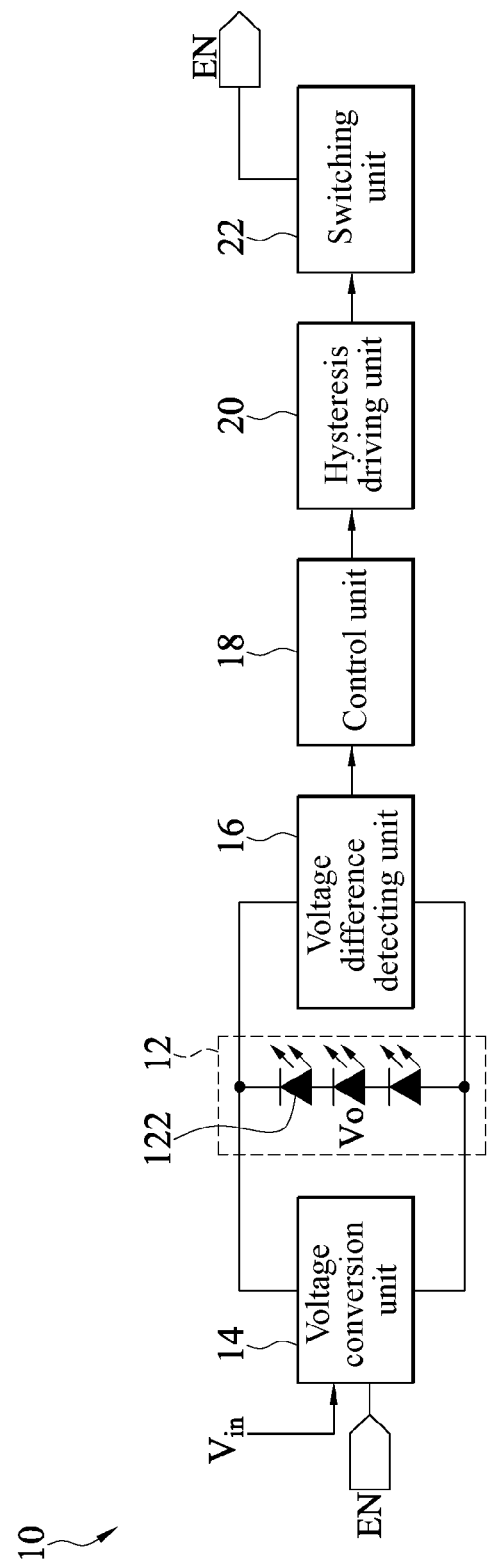
FIG. 1 is a schematic block diagram of a control apparatus for light emitting diodes (LEDs) according to an embodiment of the present invention.

FIG. 1 is a schematic block diagram of a control apparatus for light emitting diodes (LEDs) according to an embodiment of the present invention. Referring to FIG. 1, the control apparatus 10 for LEDs includes an LED unit 12, a voltage conversion unit 14, a voltage difference detecting unit 16, a control unit 18, a hysteresis driving unit 20, and a switching unit 22.

The voltage conversion unit 14 is electrically connected to the LED unit 12 to convert an input voltage $V_{in}$ to supply the LED unit 12, so that the LED unit 12 operates normally to be lit. In an embodiment, the LED unit 12 includes one or more LED strings, and each LED string consists of a plurality of LEDs. One LED string is used as an example herein, but the present invention is not limited thereto. Therefore, the LED unit 12 includes a plurality of LEDs 122 sequentially connected in series, and has a positive terminal and a negative terminal.

The voltage difference detecting unit 16 is electrically connected to the positive terminal and the negative terminal of the LED unit 12 for detecting an output voltage $V_o$ of the LED unit 12. The control unit 18 is electrically connected to the voltage difference detecting unit 16, and the hysteresis driving unit 20 is electrically connected to the control unit 18. The control unit 18 cooperates with the voltage difference detecting unit 16 to provide a predetermined voltage, the control unit 18 determines a state of the LEDs 122 in the LED unit 12 according to a detecting result of the voltage difference detecting unit 16, and the switching unit 22 is electrically connected to the hysteresis driving unit 20 and the voltage conversion unit 14. When the output voltage $V_o$ is greater than or equal to the predetermined voltage, it indicates that the LED unit 12 is normally lit, the control unit 18 notifies the hysteresis driving unit 20 to control the switch unit 22 to be open-circuited, i.e., non-conduction state, so that the voltage conversion unit 14 continuously converts the input voltage $V_{in}$ to supply the LED unit 12, and the LED unit 12 remains lit. When the output voltage $V_o$ is less than the predetermined voltage, it indicates that at least one LED 122 is damaged, and the control unit 18 notifies the hysteresis driving unit 20 to control the switch unit 22 to be short-circuited, i.e., conduction state, so that the voltage conversion unit 14 stops converting the input voltage $V_{in}$ supplied to the LED unit 12, and the LEDs 122 are completely extinguished.

Figure 2:
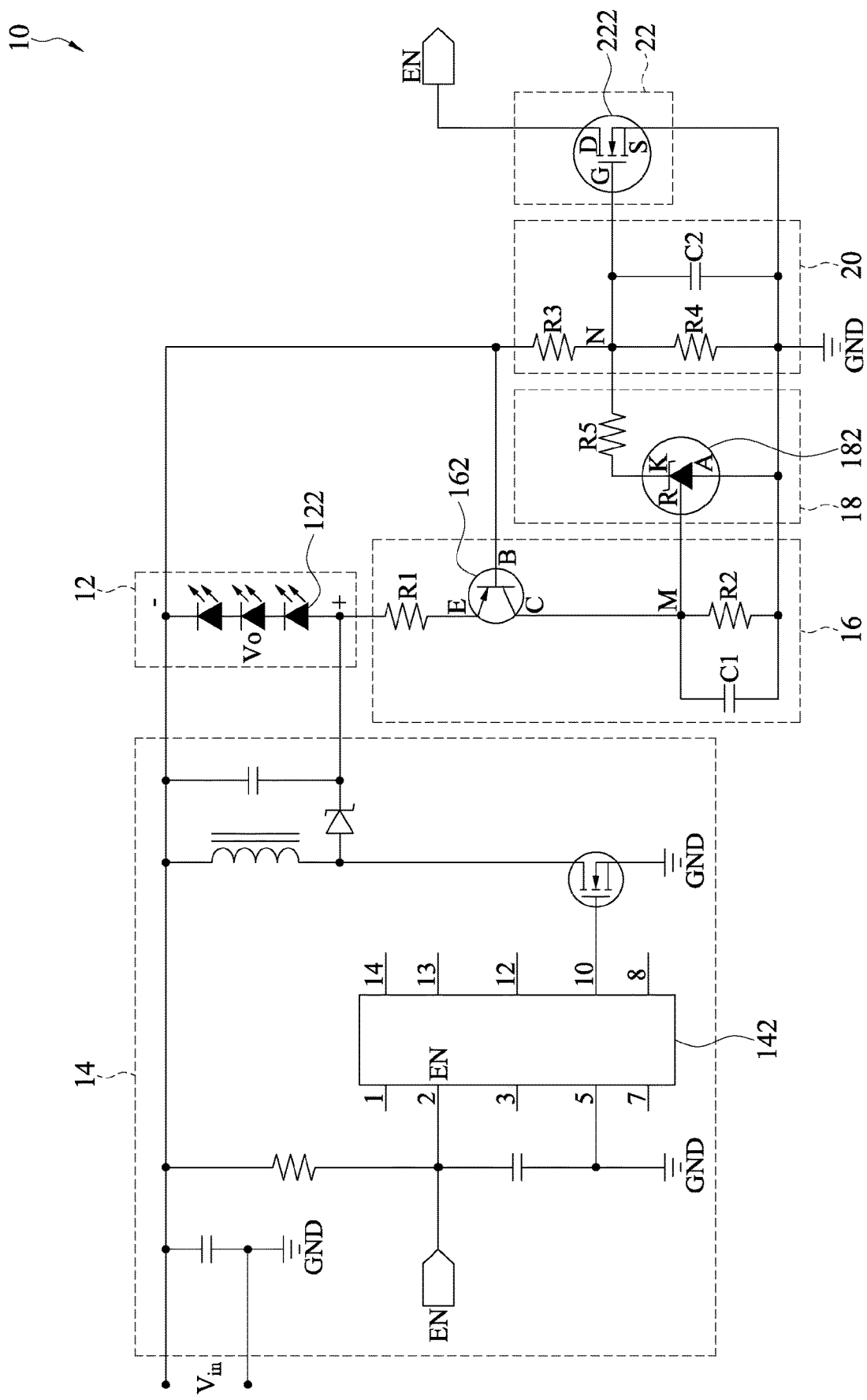
FIG. 2 is a schematic circuit diagram of a control apparatus for LEDs according to an embodiment of the present invention.

FIG. 2 is a schematic circuit diagram of a control apparatus for LEDs according to an embodiment of the present invention. Referring to FIG. 2, in the control apparatus 10 for LEDs, the voltage conversion unit 14 is, but is not limited to, a buck-boost voltage converter, and an output terminal and an input terminal of the voltage conversion unit 14 are grounded without being connected to each other, that is, the output terminal and the input terminal of the voltage conversion unit 14 do not share a common grounding connection, and the voltage conversion unit 14 includes a controller 142.

In an embodiment, the voltage difference detecting unit 16 includes a first resistor R1, a second resistor R2, a transistor 162, and a first capacitor C1. One end of the first resistor R1 is electrically connected to the positive terminal of the LED unit 12, and the other end of the first resistor R1 is electrically connected to an emitter terminal E of the transistor 162. A base terminal B of the transistor 162 is electrically connected to the negative terminal of the LED unit 12, and an emitter-base voltage $V_{EB}$ exists between the emitter terminal E and the base terminal B of the transistor 162. A collector terminal C of the transistor 162 is electrically connected to a node M at one end of the second resistor R2, and the other end of the second resistor R2 is connected to a ground terminal GND. Moreover, the first capacitor C1 is connected to the second resistor R2 in parallel, that is, one end of the first capacitor C1 is connected to the node M, and the other end is connected to the ground terminal GND. The transistor 162 may be, but is not limited to, a bipolar junction transistor (BJT), for example, a PNP-type bipolar junction transistor.

In an embodiment, the control unit 18 includes a comparison element 182 and a fifth resistor R5, and the comparison element 182 may be, but is not limited to, TL431. A reference terminal R of the comparison element 182 is electrically connected to the node M between the transistor 162 and the second resistor R2, an anode terminal A of the comparison element 182 is electrically connected to the ground terminal GND, a cathode terminal K of the comparison element 182 is electrically connected to one end of the fifth resistor R5, and the other end of the fifth resistor R5 is electrically connected to the node N. The predetermined voltage is generated through cooperation of the comparison element 182 of the control unit 18 and the transistor 162 of the voltage difference detecting unit 16. Because the comparison element 182 has a built-in reference voltage $V_{ref}$, the predetermined voltage may be represented as $$V_{EB} + \frac{V_{ref}}{R2} \times R1.$$

When the output voltage $V_o$ of the LED unit 12 is greater than or equal to the predetermined voltage, that is, $$V_o \geq V_{EB} + \frac{V_{ref}}{R2} \times R1,$$

a voltage or the node M is greater than the built-in reference voltage $V_{ref}$, so that the comparison element 182 is short-circuited, that is, the cathode terminal K and the anode terminal A of the comparison element 182 are short-circuited so the comparison element 182 is in a conduction state. When the output voltage $V_o$ of the LED unit 12 is less than the predetermined voltage, that is, $$V_o < V_{EB} + \frac{V_{ref}}{R2} \times R1,$$

the voltage or the node M is less than the built-in reference voltage $V_{ref}$, so that the comparison element 182 is open-circuited, that is, the cathode terminal K and the anode terminal A of the comparison element 182 are open-circuited so the comparison element 182 is in a non-conduction state.

In an embodiment, the hysteresis driving unit 20 includes a third resistor R3, a fourth resistor R4, and a second capacitor C2. One end of the third resistor R3 is electrically connected to the negative terminal of the LED unit 12, and the other end of the third resistor R3 is electrically connected to the node N. In this case, a voltage received by the third resistor R3 is the input voltage $V_{in}$. One end of the fourth resistor R4 is electrically connected to the node N, and the other end of the fourth resistor R4 is electrically connected to the ground terminal GND. Two ends of the second capacitor C2 are electrically connected to the node N and the ground terminal GND respectively, so that the second capacitor C2 is connected to the fourth resistor R4 in parallel. Since the third resistor R3, the fourth resistor R4, and the comparison element 182 are all connected to the node N, when the comparison element 182 is short-circuited, the node N has the first voltage, and when the comparison element 182 is open-circuited, the node N has the second voltage.

In an embodiment, a resistance value of the fifth resistor R5 is far less than resistance values of the third resistor R3 and the fourth resistor R4. For example, when the resistance values of the third resistor R3 and the fourth resistor R4 are 100 KΩ, the resistance value of the fifth resistor R5 is 1 KΩ.

In an embodiment, the switching unit 22 includes a switching element 222, and the switching element 222 may be, but is not limited to, a metal oxide semiconductor (MOS) device, for example, an N-type metal oxide semiconductor (NMOS) device. A gate terminal G of the switching element 222 is electrically connected to the node N, a drain terminal D of the switching element 222 is electrically connected to the controller 142 to transmit an enable signal or a disable signal to the controller 142, and a source terminal S of the switching element 222 is electrically connected to the ground terminal GND. When the node N has the first voltage, the switching element 222 is open-circuited when receiving the first voltage, and the switching element 222 outputs an enable signal to the controller 142 of the voltage conversion unit 14. When the controller 142 receives the enable signal, the voltage conversion unit 14 continuously converts the input voltage $V_{in}$ to supply the LED unit 12. When the node N has the second voltage, the switching element 222 is short-circuited when receiving the second voltage, and the switching element 222 outputs a disable signal to the controller 142 of the voltage conversion unit 14. When the controller 142 receives the disable signal, the voltage conversion unit 14 stops converting the input voltage $V_{in}$ supplied to the LED unit 12.

In the hysteresis driving unit 20, a hysteresis effect may be achieved through charge/discharge of the second capacitor C2, that is, actuation of the switching element 222 is delayed using the second capacitor C2, to prevent the voltage conversion unit 14 from stopping working as a result of immediate short-circuiting of the switching element 222 during power-on stage, and the second capacitor C2 may also avoid a malfunction due to noise. In addition, in the control unit 18, in addition to changing a voltage of the node N, the fifth resistor R5 is further used as a current limiting resistor, to prevent the comparison element 182 from being damaged due to a large current generated during discharge of the second capacitor C2.

During operation, referring to FIG. 2, the voltage conversion unit 14 converts the input voltage $V_{in}$ to supply the LED unit 12, to light the LEDs 122. If the output voltage $V_o$ of the LED unit 12 is greater than or equal to the predetermined voltage, that is, $$V_o \geq V_{EB} + \frac{V_{ref}}{R2} \times R1,$$

it indicates that the LEDs 122 are not damaged. In this case, the cathode terminal K and the anode terminal A of the comparison element 182 of the control unit 18 are short-circuited so the comparison element 182 is in a conduction state. Because the fourth resistor R4 and the fifth resistor R5 are connected in parallel and are connected to the third resistor R3 in series at the node N, a voltage of the node N is extremely low, and in this case, the node N has the first voltage, and the gate terminal G and the source terminal S of the switching element 222 cannot be forward-biased. Therefore, the drain terminal D and the source terminal S of the switching element 222 are still in an open-circuited state, i.e., non-conduction state, and an enable signal is generated for the voltage conversion unit 14 to maintain a normal operation of the voltage conversion unit 14, so that the input voltage Vi is continuously converted to supply the LED unit 12, and therefore all the LEDs 122 are normally lit.

If the output voltage $V_o$ of the LED unit 12 is less than the predetermined voltage, that is, $$V_o < V_{EB} + \frac{V_{ref}}{R2} \times R1,$$

it indicates that some LEDs 122 are damaged. In this case, the cathode terminal K and the anode terminal A of the comparison element 182 of the control unit 18 are open-circuited so the comparison element 182 is in a non-conduction state. Because the third resistor R3 and the fourth resistor R4 are connected in serial at the node N, in this case, the node N has the second voltage, the voltage of the node N is sufficient for forward-biasing the gate terminal G and the source terminal S of the switching element 222, so that the drain terminal D and the source terminal S of the switching element 222 are in an short-circuited state, i.e., conduction state, and a disable signal is generated for the voltage conversion unit 14 to stop an operation of the voltage conversion unit 14, and therefore the LEDs 122 are completely extinguished.

When the voltage conversion unit 14 is just turned on, output voltage $V_o$ is not established across the LED unit 12. Therefore, the cathode terminal K and the anode terminal A of the comparison element 182 are open-circuited so the comparison element 182 is in a non-conduction state, and a voltage of the node N is temporarily insufficient for forward-biasing the gate terminal G and the source terminal S because the second capacitor C2 needs to be charged for a specific time period. Therefore, the switching element 222 is open-circuited. In this case, the voltage conversion unit 14 operates normally, and converts the input voltage $V_{in}$ to supply the LED unit 12. After the voltage conversion unit 14 stably converts the input voltage $V_{in}$, whether the LED 122 is damaged may be determined according to a relationship between the output voltage $V_o$ and the predetermined voltage disclosed in the foregoing description, and details are not described herein again.

Figure 3:
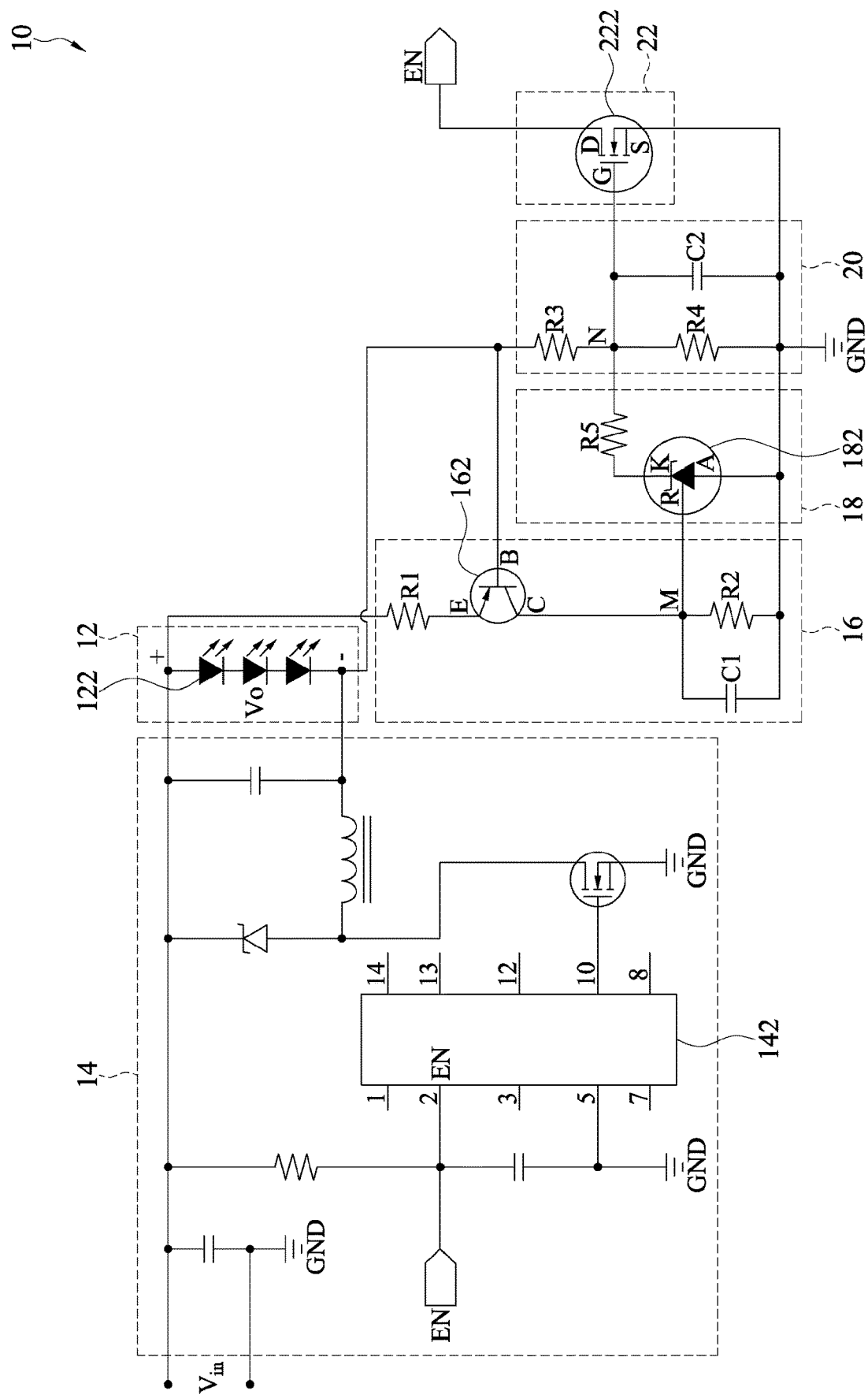
FIG. 3 is a schematic circuit diagram of a control apparatus for LEDs according to another embodiment of the present invention.

FIG. 3 is a schematic circuit diagram of a control apparatus for LEDs according to another embodiment of the present invention. Referring to FIG. 3, in the control apparatus 10 for LEDs, a voltage conversion unit 14 is, but is not limited to, a buck voltage converter, and an output terminal and an input terminal of the voltage conversion unit 14 are grounded without being connected to each other, that is, the output terminal and the input terminal of the voltage conversion unit 14 do not share a common grounding connection. Two ends of the voltage conversion unit 14 are electrically connected to an LED unit 12 to convert an input voltage yin to supply the LED unit 12, and one end of a third resistor R3 is connected to a negative terminal of the LED unit 12. In this case, a voltage received by the third resistor R3 is a value obtained by subtracting an output voltage $V_o$ from the input voltage $V_{in}$, i.e., $V_{in}-V_o$. The voltage conversion unit 14 includes a controller 142, and the controller 142 may control, according to an enable signal or a disable signal transmitted by a switching element 222, whether the voltage conversion unit 14 converts the input voltage $V_{in}$ to supply the LED unit 12. Except for different voltage conversion unit 14 that is used, other structures, connection relationships, and an operation of the control apparatus 10 for LEDs shown in FIG. 3 are the same as those in the embodiment shown in FIG. 2. Therefore, reference may be made to the foregoing description, and details are not described herein again.

Figure 4:
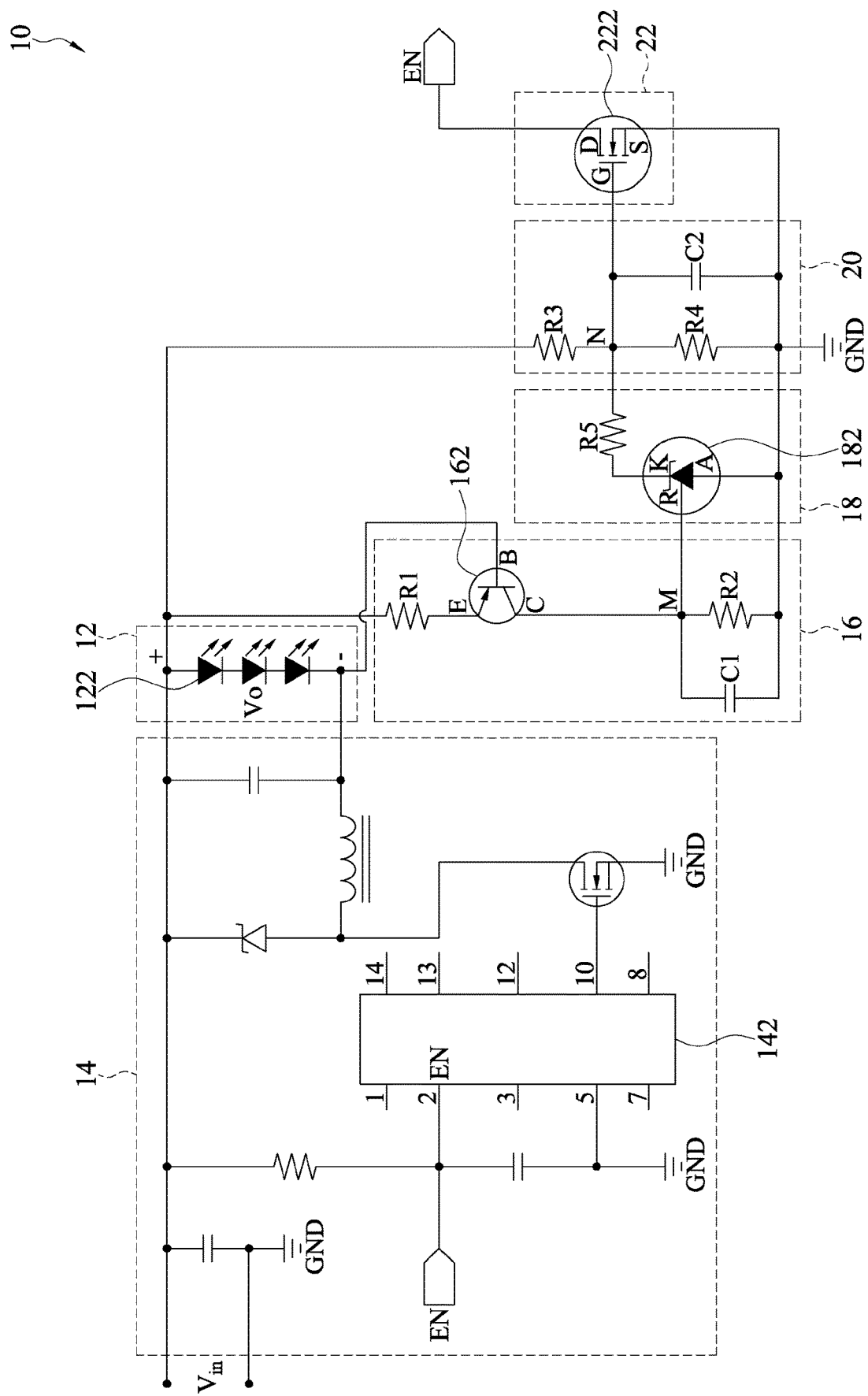
FIG. 4 is a schematic circuit diagram of a control apparatus for LEDs according to still another embodiment of the present invention.

FIG. 4 is a schematic circuit diagram of a control apparatus for LEDs according to still another embodiment of the present invention. Referring to FIG. 4, in the control apparatus 10 for LEDs, a voltage conversion unit 14 is, but is not limited to, a buck voltage converter, and an output terminal and an input terminal of the voltage conversion unit 14 are grounded without being connected to each other, that is, the output terminal and the input terminal of the voltage conversion unit 14 do not share a common grounding connection. Two ends of the voltage conversion unit 14 are electrically connected to an LED unit 12 to convert an input voltage yin to supply the LED unit 12, and one end of a third resistor R3 is connected to a positive terminal of the LED unit 12, and the other end of the third resistor R3 is connected to a node N. In this case, a voltage received by the third resistor R3 is the input voltage $V_{in}$. The voltage conversion unit 14 includes a controller 142, and the controller 142 may control, according to an enable signal or a disable signal transmitted by a switching element 222, whether the voltage conversion unit 14 converts the input voltage $V_{in}$ to supply the LED unit 12. Except for different voltage conversion unit 14 that is used and a different connection relationship of the third resistor R3, other structures and connection relationships, and an operation of the control apparatus 10 for LEDs shown in FIG. 4 are the same as those in the embodiment shown in FIG. 2. Therefore, reference may be made to the foregoing description, and details are not described herein again.

In summary, in the present invention, when the output voltage changes due to an LED in the LED unit is damaged, the voltage conversion unit stops converting the input voltage supplied to the LED unit, so that the LEDs are completely extinguished. When the control apparatus for LEDs in the present invention is applied to a vehicle lamp, LEDs are completely extinguished when at least one LED is damaged, so that unaesthetic overall appearance of the vehicle lamp is avoided, and more effectively avoiding a driving safety problem as a result of insufficient luminance of the vehicle lamp.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A control apparatus for light emitting diodes (LEDs), comprising:
    an LED unit;
    a voltage conversion unit electrically connected to the LED unit to convert an input voltage to supply the LED unit;
    a voltage difference detecting unit electrically connected to the LED unit for detecting an output voltage of the LED unit, the voltage difference detecting unit comprising:
        a first resistor electrically connected to a positive terminal of the LED unit;
        a second resistor;
        a transistor electrically connected to the first resistor, the second resistor, and a negative terminal of the LED unit respectively;
    a control unit electrically connected to the voltage difference detecting unit, the control unit cooperating with the voltage difference detecting unit to provide a predetermined voltage;
    a hysteresis driving unit electrically connected to the control unit; and
    a switching unit electrically connected to the hysteresis driving unit and the voltage conversion unit, wherein when the output voltage is greater than or equal to the predetermined voltage, the control unit notifies the hysteresis driving unit to control the switching unit to be open-circuited, so that the voltage conversion unit continuously converts the input voltage; and when the output voltage is less than the predetermined voltage, the control unit notifies the hysteresis driving unit to control the switching unit to be short-circuited, so that the voltage conversion unit stops converting the input voltage.

2. The control apparatus for LEDs according to claim 1, wherein the voltage difference detecting unit further comprises a first capacitor connected to the second resistor in parallel.

3. The control apparatus for LEDs according to claim 1, wherein the control unit comprises a comparison element electrically connected between the transistor and the second resistor, when the output voltage is greater than or equal to the predetermined voltage, the comparison element is short-circuited; and when the output voltage is less than the predetermined voltage, the comparison element is open-circuited.

4. The control apparatus for LEDs according to claim 3, wherein the predetermined voltage is $$V_{EB} + \frac{V_{ref}}{R2} \times R1,$$

$V_{EB}$ is an emitter-base voltage of the transistor, R1 is a resistance value of the first resistor, R2 is a resistance value of the second resistor, and $V_{ref}$ is a built-in reference voltage of the comparison element.

5. The control apparatus for LEDs according to claim 3, wherein the hysteresis driving unit comprises a third resistor and a fourth resistor, the third resistor, the fourth resistor, the comparison element, and the switching unit are connected to a node, when the comparison element is short-circuited, the node has a first voltage; and when the comparison element is open-circuited, the node has a second voltage.

6. The control apparatus for LEDs according to claim 5, wherein the hysteresis driving unit further comprises a second capacitor, the second capacitor is electrically connected to the node and is connected to the fourth resistor in parallel to delay actuation of the switching unit.

7. The control apparatus for LEDs according to claim 5, wherein the control unit further comprises a fifth resistor electrically connected between the comparison element and the node.

8. The control apparatus for LEDs according to claim 5, wherein the switching unit comprises a switching element, the switching element is open-circuited when receiving the first voltage; and the switching element is short-circuited when receiving the second voltage.

9. The control apparatus for LEDs according to claim 8, wherein when the switching element is open-circuited, the switching element outputs an enable signal to the voltage conversion unit; and when the switching element is short-circuited, the switching element outputs a disable signal to the voltage conversion unit.

10. The control apparatus for LEDs according to claim 9, wherein the voltage conversion unit further comprises a controller, when the controller receives the enable signal, the voltage conversion unit continuously converts the input voltage; and when the controller receives the disable signal, the voltage conversion unit stops converting the input voltage.

* * * * *